United States Patent [19]
Williams

[11] Patent Number: 6,081,205
[45] Date of Patent: Jun. 27, 2000

[54] ELECTRONIC PARKING METER AND ELECTRIC AUTOMOBILE RECHARGING STATION

[76] Inventor: Douglas J. Williams, 25940 Coloretti Ct., Valencia, Calif. 91355

[21] Appl. No.: 08/320,382

[22] Filed: Oct. 11, 1994

Related U.S. Application Data

[63] Continuation-in-part of application No. 07/885,338, May 19, 1992, abandoned.

[51] Int. Cl.$^7$ .................................................... B60Q 1/48
[52] U.S. Cl. ..................... 340/932.2; 235/381; 235/384
[58] Field of Search ................................. 235/381, 384; 340/932.2

[56] References Cited

U.S. PATENT DOCUMENTS

| | | | |
|---|---|---|---|
| 3,900,092 | 8/1975 | Page | 235/384 X |
| 4,050,063 | 9/1977 | Schull | 235/382 |
| 4,163,215 | 7/1979 | Iida | 235/382 |
| 4,532,418 | 7/1985 | Meese et al. | 235/381 |
| 4,861,971 | 8/1989 | Chan | 235/384 |
| 4,866,661 | 9/1989 | de Prins | 235/382 |
| 4,993,627 | 2/1991 | Phelan et al. | 235/382 |
| 5,166,680 | 11/1992 | Ganot | 235/384 |
| 5,231,272 | 7/1993 | Mardon | 235/382 |
| 5,260,551 | 11/1993 | Wiik | 235/382 |
| 5,407,049 | 4/1995 | Jacobs | 235/384 X |

*Primary Examiner*—Harold I. Pitts
*Attorney, Agent, or Firm*—Kelly Bauersfeld Lowry & Kelley, LLP

[57] ABSTRACT

An electric vehicle recharging parking meter includes a parking meter, a processor, a display interconnected to the processor for giving visual information to a user, and an input device interconnected to the processor. The input device enables the user to select the parking time and/or the recharging time for the electric vehicle. The processor is responsive to the user selection of recharge time, parking time, and recharge power requirements entered on the input device. A payment receptor for receiving payment for the parking and recharge time selected by the user is interconnected to the processor for indicating receipt of payment for parking time and recharge electricity. The processor enables a switch to close so that power will be supplied to the vehicle from a power source. A connector is attached to a post or stand on this the meter may be mounted whereby the electric vehicle can be interconnected to the power source. A power controller, operable in response to signals from the processor, is interconnected between the power source and the connector.

17 Claims, 5 Drawing Sheets

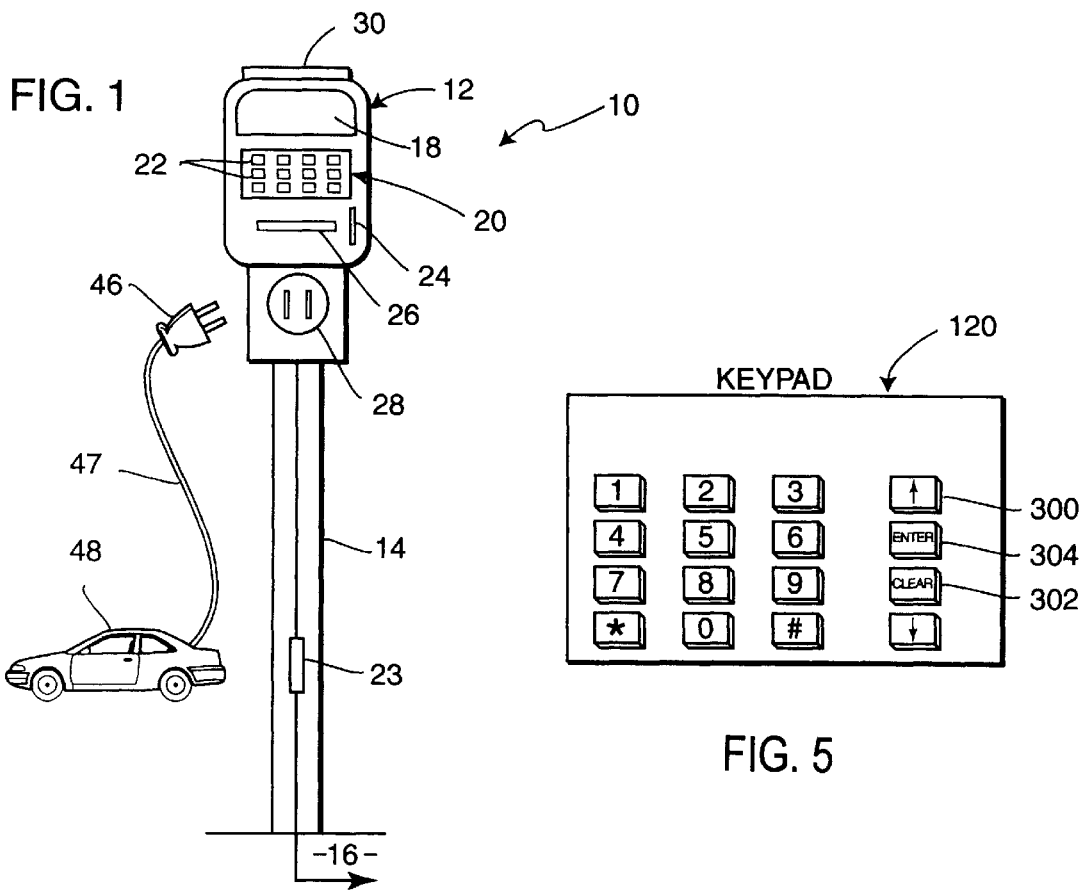
FIG. 1
FIG. 5
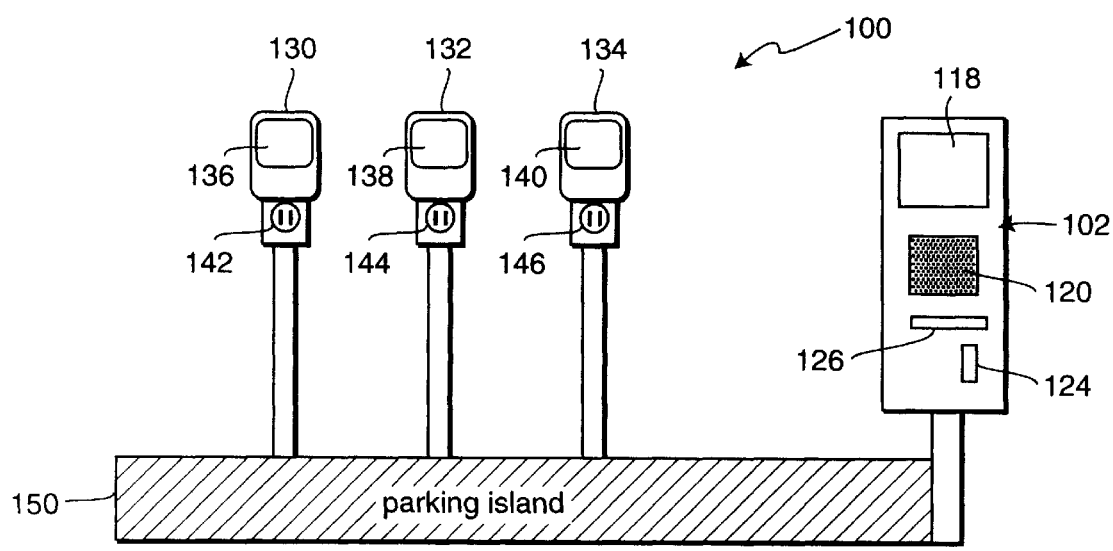
FIG. 3

ELECTRONIC PARKING METER AND ELECTRIC AUTOMOBILE RECHARGING STATION

This is a continuation of application Ser. No. 07/885,338 filed May 19, 1992, which was abandoned upon the filing hereof.

BACKGROUND OF THE INVENTION

The present invention relates to electronic parking meters and in particular to parking meters which can also be used as an electric car battery recharging station capable of providing various power levels depending on the requirements of the electric car batteries to be recharged.

Automobile battery charging has generally been accomplished using small portable charging devices. Such devices include small portable chargers commonly seen in automobile parts stores and gas stations, as well as generators and alternators driven by internal combustion engines. With the advent of electric automobiles, the requirements for such chargers has changed drastically. The number and size of batteries required for electric cars renders charging by standard methods unrealistic because of the amount of time required and the unavailability of convenient recharging stations. The result has been a new generation of chargers which have different power requirements and capacities.

These new chargers are sometimes mounted in the electric automobile itself. When an owner of the electric automobile needs to recharge the batteries, he drives the car into his garage and plugs the onboard charger into the household electric current. Generally, such chargers take several hours to recharge electric automobile batteries with the time required related directly to the current and voltage available to the batteries. Since it is necessary to match current requirements and charging voltage to the vehicle batteries for the most efficient charging mode, chargers generally have one or more step-up or step-down transformers included in their circuitry. If one desired to increase charging speed, it would necessitate larger voltages and currents, with resultant larger transformers and related circuitry. Since electric automobiles are sensitive to weight, and since larger transformers are generally quite heavy, it is unlikely such increased capacity chargers will be placed in the electric vehicle.

Currently, power available to recharge vehicles is restricted to the owner's home or possibly the owner's office. Since electric automobiles using current technology have to be recharged every 75–200 miles of operation, a problem exists which severely limits the realistic use of electric automobiles.

Public availability of recharging facilities and power sources simply does not exist.

SUMMARY OF THE INVENTION

The present invention is an electric vehicle recharging parking meter which includes a parking meter, a processor, a display interconnected to the processor for giving visual information to a user, and an input device interconnected to the processor. The input device enables the user to select the parking time and/or the recharging time for the electric vehicle. The processor is responsive to the user selection of recharge time, parking time, and recharge power requirements entered on the input device by the user. A payment receptor for receiving payment for the parking and recharge time selected by the user is interconnected to the processor for indicating receipt of payment for parking time and recharge electricity. The processor enables a switch to close so that power will be supplied to the vehicle from a power source. A connector is attached to a post or stand on which the meter may be mounted whereby the electric vehicle can be interconnected to the power source. A power controller is interconnected between the power source and the connector and is coupled to be controlled in response to signals from the processor. The power controller selectively provides power to the connector in response to commands from the processor.

The parking meter may include a support post on which a housing is mounted, with the display, input device, payment receptor and connector being mounted in the support post housing.

The power controller may include a transformer coupled to the power source for converting the power from the power source to power having a voltage compatible with the electrical vehicle and a voltage selector switch which operates to interconnect the proper voltage to the connector in response to commands from the processor.

The payment receptor can be a coin device as on vending machines or may be a credit card magnetic strip reader like those used in restaurants. In such a case, a communications link will be coupled between the magnetic strip reader and an approval center so that the credit card information read by the magnetic strip reader can be approved by the approval center and charged to the account of the user.

Suitable safety devices can also be incorporated into the meter. For example, a ground fault interrupt switch can be interconnected between the power source and the remainder of the system to cut off power to the parking meter system in the event of an accident or damage to the meter system. Alternatively, the system may include a mercury type position switch in the power circuit. The mercury switch is mounted in the post of the meter and would disconnect the power supply power if a vehicle ran into the support post bending it to a non-vertical position.

In another embodiment, the invention can be a system of individual meters interconnected to a central unit. The processor, display, input device and payment receptor are a part of the central unit with the plurality of parking meters interconnected to the central unit for being controlled by the central unit. Each individual parking meter then includes the connector for interconnecting the power source to the electric vehicle and a separate display for providing visual information to the user. A power controller is interconnected between the power source and the connector of each of the plurality of parking meters and is operable in response to signals from the processor for selectively providing power to the plurality of connectors.

The present invention can also be used without the power recharge feature and as such may be used solely as a parking meter or parking meter system.

BRIEF DESCRIPTION OF THE DRAWINGS

A complete understanding of the present invention and of the above and other objects and advantages thereof may be gained from a consideration of the following description of the preferred embodiment taken in conjunction with the accompanying drawings in which:

FIG. 1 is an illustration of a parking meter in accordance with the invention.

FIG. 3 is an alternative embodiment of the parking meter system wherein a plurality of individual meters are controlled by a central unit.

FIG. 5 is a simplified illustration of a keypad which could be used in conjunction with the parking meter shown in FIG. 1 or the central unit shown in FIG. 3.

DETAILED DESCRIPTION

Figure 2:
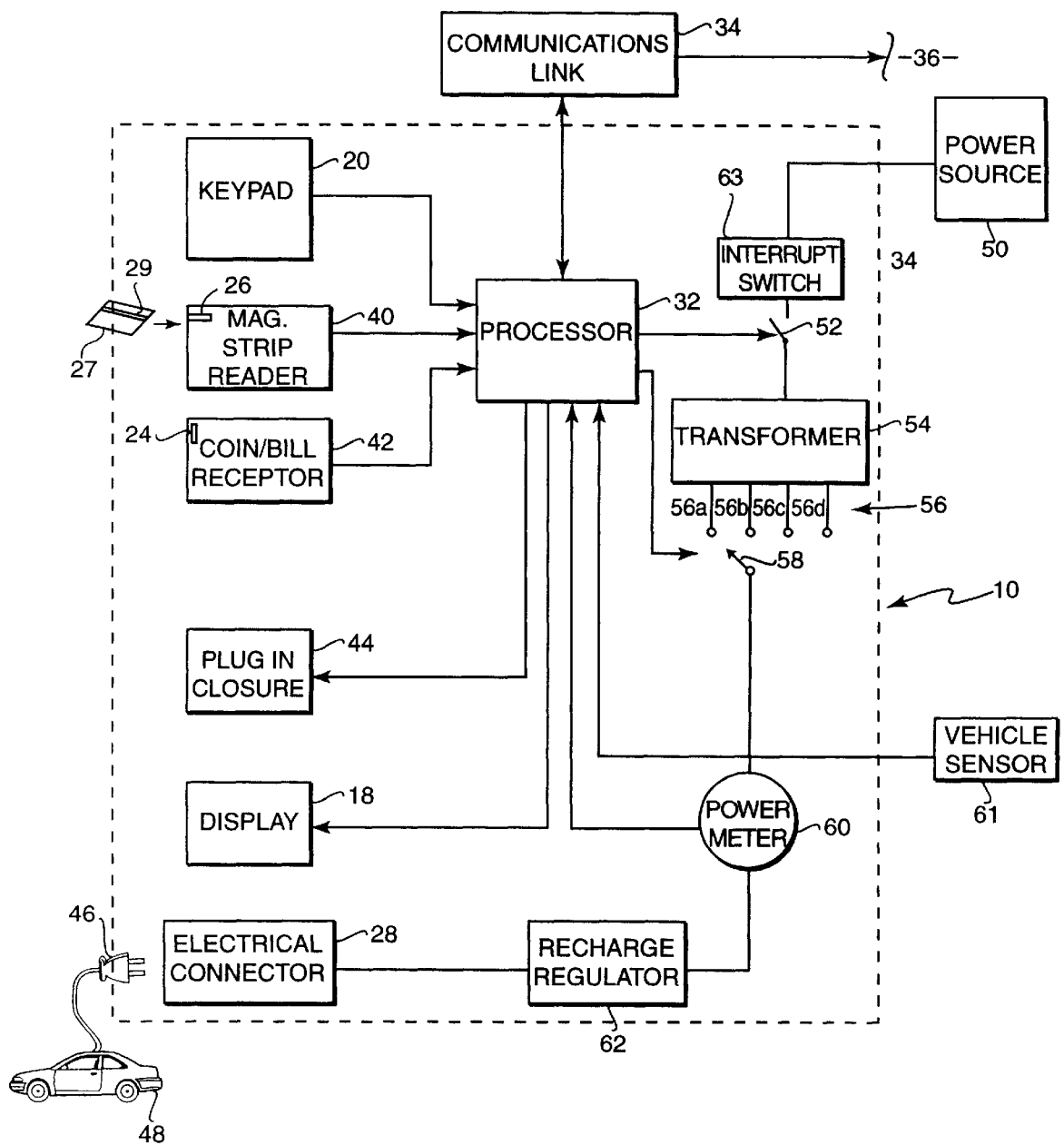
FIG. 2 is a block diagram of a parking meter system which utilizes the parking meter of FIG. 1.

Turning initially to FIG. 1, a parking meter 10 in accordance with the invention includes a housing 12 positioned on top of a post 14 which is mounted in a conventional manner on the ground 16 adjacent a parking space at a street curb or in a parking lot. The parking meter 10 includes a display 18 which displays information about the meter status and provides instructions to a user as to the operation of a parking meter 10. The parking meter 10 also includes a keypad 20 which has a plurality of keys 22 which may be depressed in response to information on the display 18 to enable user control of the parking meter. A money receptor slot 24 into which a user can insert payment for parking time and the electrical power to be used to recharge an electric car is also mounted in the housing 12. The money receptor 24 may be either a coin or token slot or a paper bill receptor of a type commonly available to receive bills and give change.

The parking meter 10 may also include a credit card receptor slot 26 which is part of a magnetic strip reader or other card reader whereby the user can pay for either parking time or electricity to recharge an electric car by simply inserting a credit card into the slot 26. The parking meter also has a connector 28 into which a plug 46 and electric power cord 47 from an electric vehicle 48 can be inserted to transfer power from the meter 10 to recharge the batteries of the electric vehicle 48.

In one embodiment, the parking meter 10 may also include a solar cell panel 30 which may be interconnected to power the electronics in the parking meter including the display 18, if the display is electronic, the keypad 20, if interconnected as part of an electronic circuit, or any other electronics which may be a part of the parking meter operation.

Turning to FIG. 2, one embodiment of the parking meter system 10 includes the keypad 20 which provides electronic signals to a processor 32 to cause the processor 32 to generate control signals to various other components of the parking meter 10. A magnetic strip reader 40 is also provided with the credit card receptor slot 26 to receive credit cards 27 and read, for example, identifying information from a magnetic strip 29. Magnetic strip readers which may be utilized are well known and are conventionally used in restaurants to read and transmit identifying information from the magnetic card and the amounts to be charged inputted via the keypad 20 via a suitable communications link, such as link 34, to a central clearing computer such as central computer 36. The central computer 36 can also provide information to the processor in response to transmission of credit card information.

Of course, the processor 32 could also accumulate the credit card identity and information as to the amount to be charged in a memory. That information would then read out or be transferred via a connector to a portable memory carried by a meter maid in response to the insertion of a specially coded credit card into the mag strip reader or some other memory and collected device. Alternatively, the processor 32 could be programmed to store prepaid time and then charge any use charges against that prepaid time and permit operation of the meter based on the prepaid time in a manner much like that used to pay for photocopies in libraries and the like.

A parking meter in accordance with the invention also includes a money receptor 42 which includes a coin, bill or, token receptor slot 24. Similar coin, bill, or token receptors 42 are found in numerous devices such as vending machines wherein the amount of money inserted is sensed and that sensed quantity transmitted to the processor 32 which then sends appropriate signals to various switches to turn on or turn off electric power or to the display to indicate parking time and subsequently parking time termination. The processor 32 is also coupled to a plug-in closure apparatus 44 to be described hereafter which provides a physical cover over the connector 28 to prevent insertion of the plug 46 from the car 48 unless a credit card has been inserted in the credit card slot 26 of the magnetic strip reader or money has been inserted in the money receptor 42.

The processor 32 is also interconnected to the display 18 which may be an LCD display or any other suitable display to instruct the user on what information is required and how to insert that information via the keypad 20 in a manner to be described hereafter.

Power to recharge the vehicle 48 is provided through a power source 50 which may be connected to power lines, power storage device such as a battery, or other power source such as solar cells, wind generators or any other suitable power-generating apparatus. The power from power source 50 may be interconnected to a transformer 54 which transforms the power from the power source 50 into power at a desired voltage, frequency or current to match the requirements of the electric vehicle 48 as may be defined by the user through keypad 20. The power from power source 50 is coupled to the transformer 54 through a switch 52 which is actuated in response to a signal from the processor 32. For example, the processor 32 could be programmed to close switch 52 allowing power from the power source 50 to charge a vehicle 48 only if a credit card 27 had been inserted into the reader 40 or the required money for a vehicle recharge had been deposited in the receptor 42.

The transformer 54 has a plurality of output leads 56 each of which provides electricity at a different voltage. A switch 58 is then interconnected to select one of the voltage leads 56 in response to a signal from the processor 32. For example, the processor 32 may be programmed to provide information to the display 18 instructing the user to select a particular voltage (or frequency or current) level using the keypad 20. Once the voltage select information from the keypad 20 was received by the processor 32, the processor would generate a signal which would actuate the switch 58 to select the appropriate lead 56a, 56b, 56c or 56d corresponding to the voltage (or frequency or current) level selected.

The parking meter 10 may also include a power meter or sensor 60 which accumulates the kilowattage of electrical power passing from the transformer 54 to the electrical connector 28. The power meter 60 is interconnected to the processor 32 to provide power usage information to the processor 32 which can be programmed to deactivate switch 52 or to provide information to the display 58 when the power consumption has reached a particular quantity. For example, a user could select a particular number of kilowatts of electricity to be used to recharge the vehicle 48 by following instructions displayed on the display 18 and inserting the kilowattage of electricity to be used on keypad 20. That value would then be received by the processor 32 and continuously compared with the actual power usage supplied from the power meter 60 until a match occurred at which point the processor would generate a signal opening the switch 52 and terminating any further electrical usage to charge the batteries of the vehicle 48.

In another embodiment, a recharge regulator 62 could be interposed between the power meter 60 and the electrical connector 28. The recharge regulator 62 would terminate the flow of electricity through the electrical connector 28 when the batteries of the electrical vehicle 48 were fully charged. The processor 32 could then read the amount of power utilized to recharge the vehicle from the power meter 60 after which a computation of power cost could be made and automatically charged to the credit card account via communications link 34. Alternatively, the processor 32 could indicate the amount of money to be deposited on display 18 at which point the user would deposit the appropriate amount of money in the receptor 42 or in the reader 40.

The processor 32 can be any of a number of well-known digital processor which can be programmed to provide signals to switches 52 and 58 and the display 18 in response to data received from the keypad 20, the reader 40, the receptor 42 and the power meter 60. The transformer 54 is likewise a conventional transformer well known in the art which would be selected to provide the desired electricity to the electrical connector 28 to recharge the electric vehicle 48. Likewise, the power meter 60 would be any conventional power meter such as those used to measure the power used in homes with the recharge regulator also being a conventional device used, for example, in conventional recharging mechanisms used to recharge golf carts and the like.

The system 10 may also include a vehicle presence sensor 61 in the parking space adjacent the meter. This sensor may be a sensor of the type imbedded in roadways adjacent intersections and used to trigger the change of the intersection light.

Figure 7:
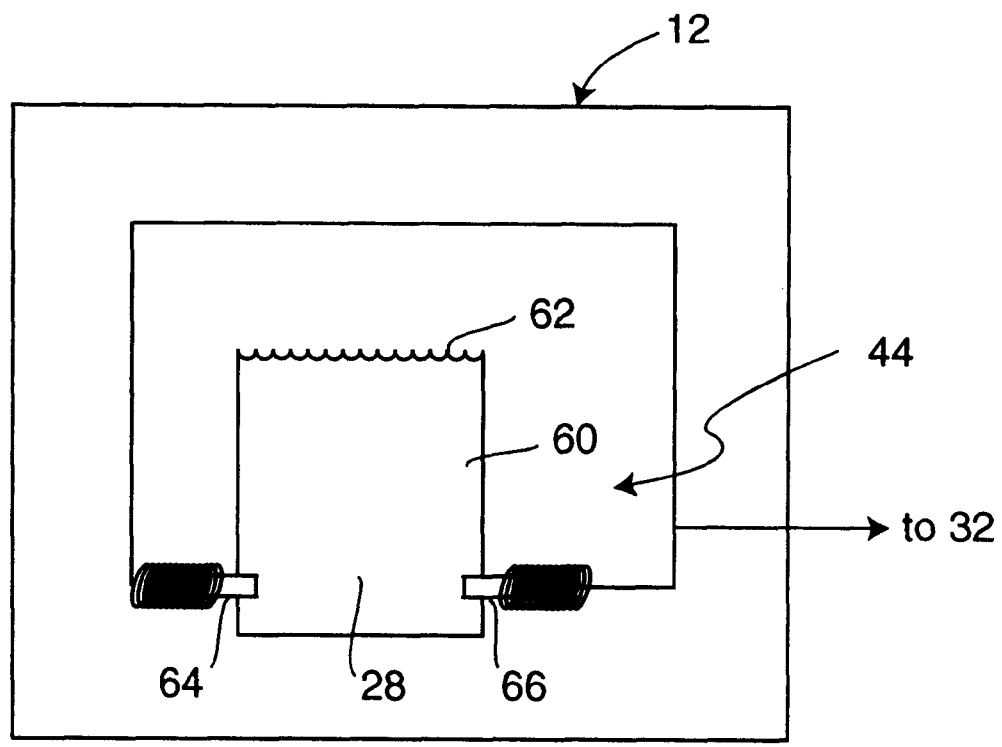
FIG. 7 is a simplified diagram of an access device covering the connector of each parking meter to prevent access to the connector absent meeting certain predefined criteria.

The parking meter 10 may include a plug-in closure device 44 which may, for example, be a device such as that illustrated in FIG. 7 wherein the access to the connector 28 of the housing 12 is limited by a cover 70 hinged by a hinge 72 to the housing 12 at a location where it will pivot over the connector 28 and prevent access unless the cover 70 is pivoted upward. A pair of solenoid latches 74 and 76 are mounted to the housing 12 and are positioned to engage suitable slots orifices or other latching mechanisms in the cover 70. The solenoids 74 and 76 are then interconnected to the processor 32. Consequently, when the appropriate amount of money has been inserted in the receptor 42 or a credit card has been inserted in the reader 40, the processor 32 will generate a signal which will cause the solenoid latches 74 and 76 to be actuated releasing those solenoid latches from engagement with the cover 70 and permitting the cover to be pivoted about hinge 72 to allow the plug 46 to be inserted in the connector 28.

Various safety devices may also be incorporated into the system. For example, one or more interrupt switches such as a ground fault interrupt switch 63 (FIG. 2) may be incorporated in the power circuitry. Thus, if a parking meter is damaged or a short circuit occurs, the switch 63 will automatically disconnect the power source from the parking meter system or a portion of the parking meter system. If the processor and other related components are also powered by the power source then the switch 63 could be positioned to disconnect all power including processor power or could be positioned to disconnect just the power to the connector. Referring to FIG. 1 again, the interrupt switch could also be a conventional mercury switch 23 mounted in the post 14 or at any other suitable location. Thus, if the post 14 is hit by a vehicle and moves out of a vertical position, the switch 23 will disconnect the power from the power source to the connector 28.

Referring to FIG. 3, a multiple meter recharge system 100 is illustrated including a central unit 102 which includes a display 118, a keypad 120, a credit card receptor slot 126 and a money receptor slot 124. The central unit 102 is interconnected to each of a plurality of meters 130, 132 and 134 which have displays 136, 138 and 140 and connectors 142, 144 and 146 respectively. The plurality of meters are mounted on a parking or recharge island 150 and are electrically interconnected to the central unit 102.

In operation, a user of one of the meters, such as meter 130, will provide the required information for that particular meter by inserting the information through the central unit 102.

Figure 4:
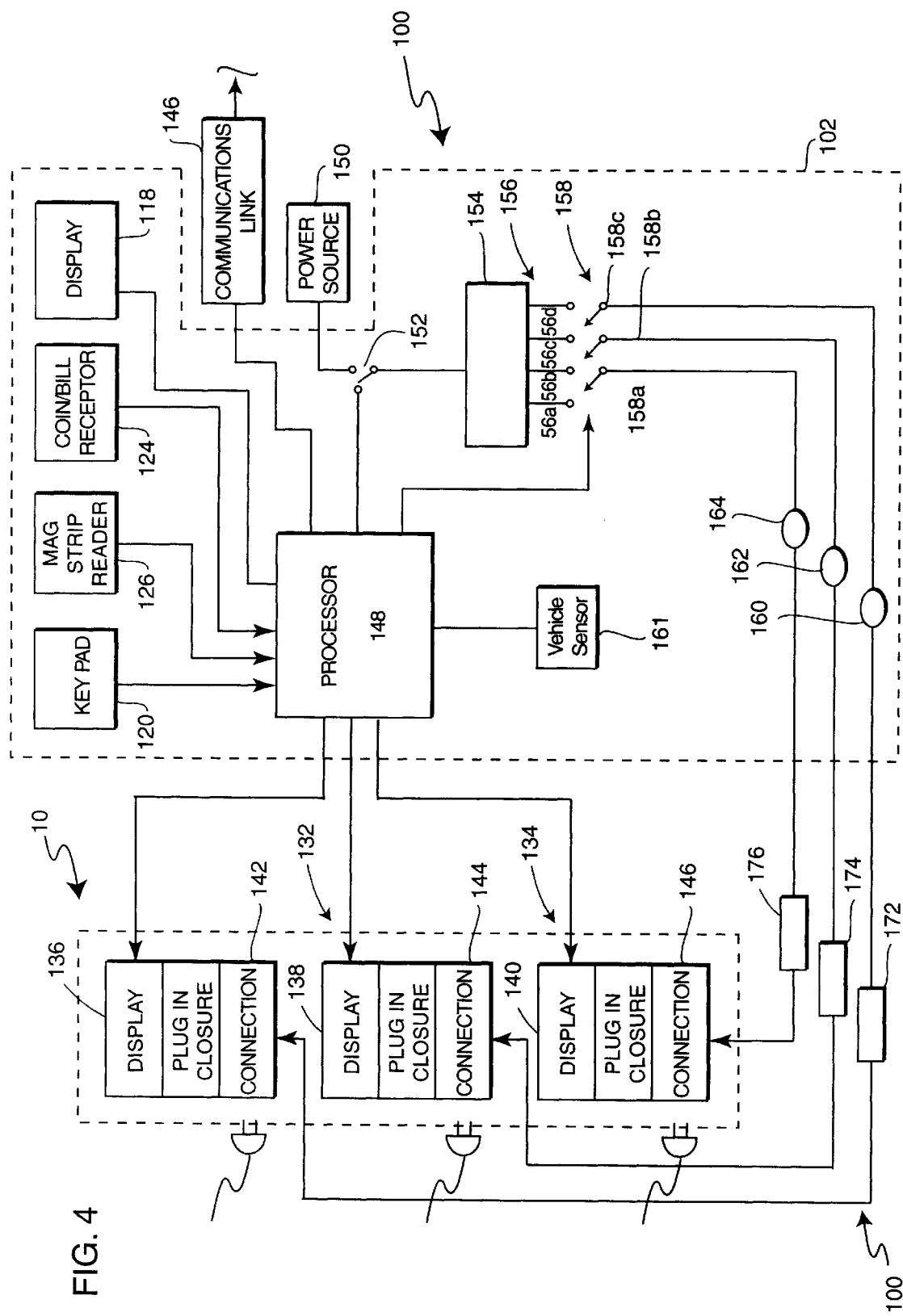
FIG. 4 is a block diagram of the parking meter system depicted in FIG. 3.

Referring to FIG. 4, a block diagram of the parking meter system 100 includes the central unit 102 interconnected to the individual parking meters 130, 132 and 134, although any number of parking meters may be utilized. Also, as described in connection with FIGS. 1, 2 and 7, each of the connectors 142, 144 and 146 may include an access control cover to prevent interconnecting a plug from an electrical car into the connector.

The operation of the system of FIG. 4 is similar to that described in connection with FIG. 2 except that the information controlling the dispensing of electrical power, selection of parking time and payment of money for the power and/or parking time is controlled from the central unit 102 rather than from the individual parking meters. As such, the central unit has a keypad 120, a magnetic strip or other card reader 126, a coin/bill receptor 124 and a display 118. The processor 148 provides signals to the display 118 to instruct the user on how to input data such as selecting the particular parking meter to be used, the amount of electrical wattage to be dispensed, the amount of parking time required and the voltage or other electrical parameters which must be set so that the particular electrical requirements of the vehicle will be matched to the charging electricity from the power source 150. The processor 146 receives data as to payment for parking time or electricity from either the receptor 124 or the mag strip reader 126. Other instructions are received from the keypad 120 which is actuated in response to inquiries provided on the display 118 in response to the processor 148.

As described in connection with FIG. 2, the processor 148 may be interconnected to a communications link 146 to provide credit card approval or any other remote communications required or useful in controlling the operation of the meter system illustrated in FIG. 4. As in FIG. 2, a power source 150 is interconnected to each of the connectors 142, 144 and 146 of each of the remote parking meters 130, 132, and 134 through a switch 152, a transformer 154, a power select switch 158, a plurality of power meters 160, 162 and 164, one for each parking meter 146, 144 and 142, and a plurality of recharge regulators, 172, 174 and 176, one for each parking meter 146, 144, and 142. The processor 148 provides commands to switches 152 and 158 to respectively turn on or turn off the power and to select the required voltage (current or frequency) from the transformer 154 for a selected meter to which that power is to be supplied.

For example, the processor 148 may be programmed to close the switch 152 and thereby connect the power source 150 to one or more of the connectors 142, 144 and 146 in response to payment for power and parking time via the magnetic strip reader 126 or the coin/bill receptor 124. When the processor 148 senses the payment has been received, the processor 148 generates a signal to close the switch 152 to couple the power source 150 to the transformer 154.

The selection of the particular voltage (current or frequency) occurs by the user inserting the required power parameters via the keypad 120. The processor 148 then generates a signal which selects one of the lead 156a, 156b, 156c, or 156d which provides the selected power parameters. In conjunction with this voltage selection, it is also necessary for the processor 148 to know which meter the selected power is to be provided to. Accordingly, before the processor can interconnect a particular voltage to a particular meter, the user must input a selection as to the meter via keypad 120. Therefore, the processor 148 will first select the particular switch 158a, 158b or 158c depending on which meter is selected by the user via keypad 120. The processor will then move the selected switch 158a, 158b or 158c to the desired voltage terminal 156a, 156b, 156c, or 156d according to the voltage selection by the user via keypad 120. Switch 158a is then connected to connector 146 via power meter 164 and recharge regulator 176; switch 158b is interconnected to connector 144 via power meter 162 and recharge regulator 174; and switch 158c is interconnected via power meter 160 and recharge regulator 172 to connector 142. Each of the power meters 160, 162 and 164 provides information as to the quantity of power used to the processor 148 in the same manner described in connection with FIG. 2.

Figure 6:
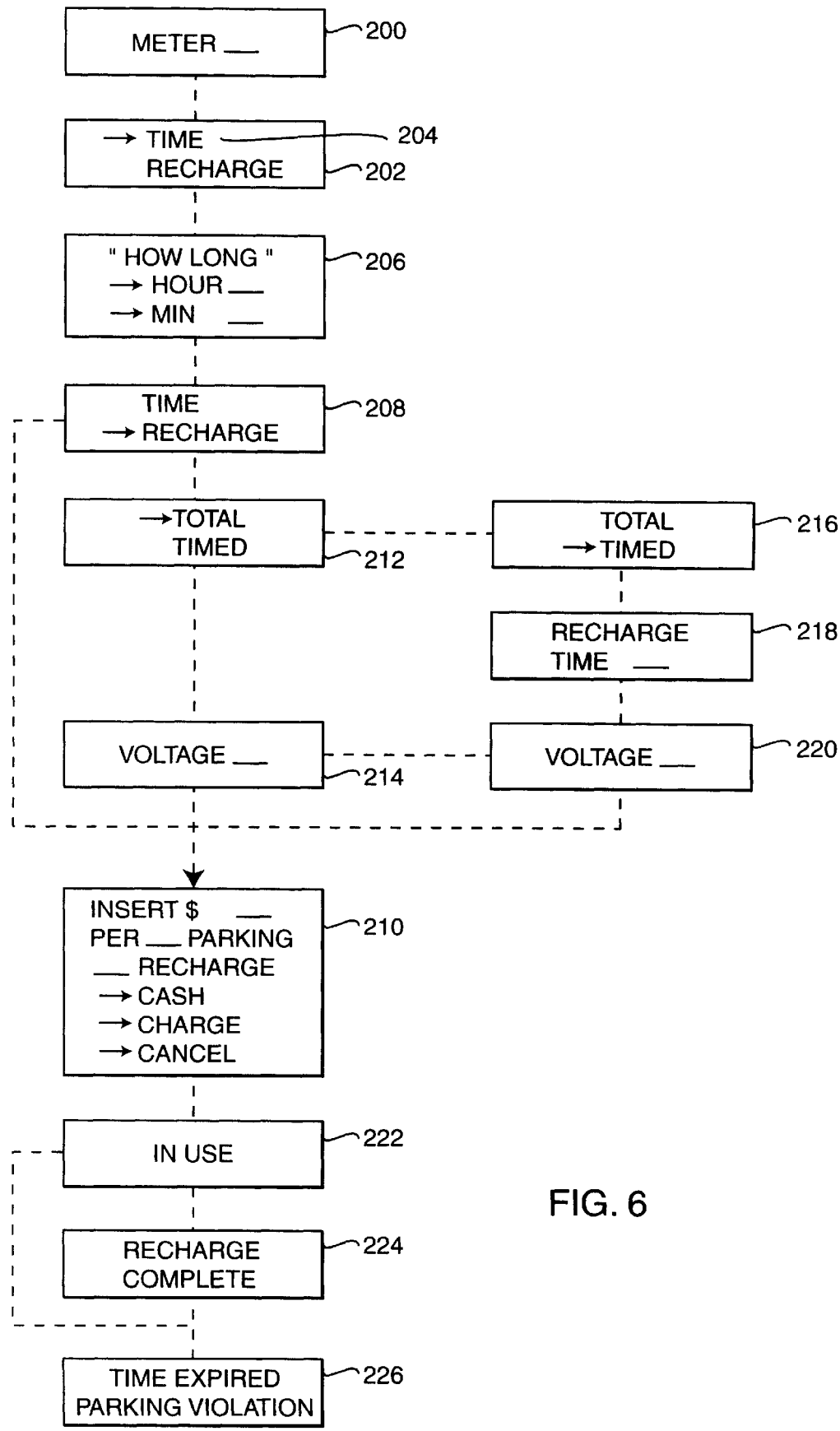
FIG. 6 is a simplified block diagram illustrating the display messages provided by the processor to facilitate use of the parking meter system.

Referring to FIGS. 4, 5 and 6, an illustration of how the processor may be programmed to operate to dispense both parking time and power usage will now be described. In FIG. 6, each block illustrates a different message to be displayed on display 118 in response to commands from processor 148. Initially, the displays 136, 138 and 140 on the meters may show a "violation" message indicating that any vehicle parked in that space is in violation and subject to being ticketed as occurs with conventional parking meters.

When a user enters a parking space adjacent the appropriate parking meter, the user will exit his car noting the identifying number of the meter adjacent the parking space and will go to the central unit 102. The display 118 (FIG. 3) might initially request the user to insert the meter number by depressing the appropriate keys on the keypad illustrated in FIG. 5 and then pressing the "enter" button. If the user makes an error at any time in the selection process, the user can simply press the clear button which will cause the display 118 to again request the meter number as illustrated by block 200 in FIG. 6. Once the user has selected the particular meter via keypad 120, the processor 148 might next display a "time" or "recharge" option indicating either parking time or recharge time. The user, using the cursor control buttons 300 and 302 on the keypad 120 (FIG. 5), will move the pointer 204 to either indicate "time" or "recharge." If the pointer is moved to "time" and the operator presses the "enter" button on keypad 120, the processor 148 will cause the display 118 to display a message requesting the hours and minutes of parking time (block 206) after which the user will first insert a number indicating the number of hours of parking time desired and then the number of minutes desired via keypad 120. Once this information has been provided and is displayed on display 118, the user will again press the "enter" button 304. The processor 128 will next again display the "time" and "recharging" options (block 208). The user then has the option of selecting the "recharge" or "no recharge" options. If the user selects the "no recharge" option, the processor immediately displays a request for the user to insert a particular amount of money based upon the parking time (block 210). If the user selects a "recharge" option in block 208, the processor will display (block 212) a request for the user to select either a total recharge or a particular amount of time for recharging. If the user selects a total recharge then the processor requests the user to insert the voltage (or other power parameters) in block 214. When the user inserts the amount of the voltage through keypad 120, the processor 148 again causes the display 118 to request insertion of either a specific amount of money or request that a charge card be inserted if the amount is indefinite and cannot be determined until after recharging has been completed. If the user in response to the request in block 212 selects a timed recharge as illustrated in block 216, again using the cursor control buttons 300 and 302 and the enter button 304 on the keypad 120, the processor causes the display 118 to request the user to insert the recharge time (block 218). The user inserts that selected time via the keypad and then again presses the enter button 304 after which the processor causes the display 118 to request the user to insert the voltage (block 220).

At this juncture, the user has inserted all of the information required for the processor to compute the cost of both parking and recharge. Alternatively, if a total recharge is requested and a recharge cost cannot be determined in advance, the processor could be programmed to require that payment be made by charge card with the amount charged to the card determined after recharging has been completed. Again, whenever a charge card is used, the keypad 120 can be used to permit the user to insert a PIN number with the communications link 146 then being similar to those presently used in gas stations to dispense gasoline or at automatic teller machines used by banks.

Turning again to FIG. 6, the processor will display in block 210 the amount of money required and may inform the user of the amount of parking time selected and the amount of recharge time selected. The same display can provide cursor selection using cursor keys 300 and 302 to allow the user to pay either by cash via the receptor 124, or by charge card using the mag strip reader and the keypad 120 if a PIN number is to be required. The user will then make the appropriate selection and insert payment into the receptor 120 or the reader 126 at which point the display on the particular meter selected will indicate that it is in use or will optionally indicate the amount of time remaining or the amount of recharge time remaining in block 222. Either the same or separate display provided by the processor 148 may also indicate when the recharge has been completed (block 224). When the time has expired the display can indicate a parking violation 226. Optionally, if the maximum amount for parking is to be paid indicating unlimited time, then the processor will not display a parking violation as depicted in block 226.

Yet another option is to provide unlimited parking but to determine the amount to be charged for that parking by incorporating a sensor such as the vehicle sensor 61 in FIG. 2 or the vehicle sensor 161 in FIG. 4 which registers and charges a credit card for example with the total fees for parking and recharging when the car is removed from the parking spot in front of the meter. Sensors of a type which could be used for vehicle sensors 61 and 161 in FIGS. 2 and 4, respectively, include pressure or magnetic sensors imbedded in the asphalt adjacent the meter similar to those imbedded in roadways and used to trip traffic lights.

While specific embodiments of the present invention have been described it will be appreciated that many other options are possible. In particular, the processor 148 may be programmed in any desired way to sequence through a series of instructions and information requests. Also it will be appreciated that while the sequence of FIG. 6 has been described in connection with the system depicted in FIG. 4, a similar sequence could be implemented for the processor 32 in FIG. 2. The only difference being that the identity of the meter requested in block 200 would be unnecessary. Also the mag strip reader could be a reader which obtains information from any medium including optical readers, audio tone detectors and the like.

The embodiment of the invention set for above are described as being of electronic type. However, the processor within the invention may be implemented as a mechanical device with the various function being performed mechanically. In such an embodiment, the mechanical "processor" can include a clock, various mechanical switches actuated in response to the insertion of money or depression by a user to select voltage recharge levels. Also, the input device could be configured so that insertion of a coin or token in one of several slots would define the amount of parking time and charge voltage depending on the particular slot used and the value of the token or coin inserted.

What is claimed is:

1. An electric vehicle recharging parking meter comprising:

a processor;

a display interconnected to the processor for giving visual information to a user;

an input device interconnected to the processor for enabling the user to select a recharging time for the electric vehicle and a parking time, the processor being responsive to the user selection entered on the input device to select the time for parking and the time for recharging the vehicle;

a payment receptor for receiving payment for the parking and recharge time selected by the user, the payment receptor interconnected to the processor for indicating receipt of payment for parking time and recharge electricity;

a power source;

a connector for interconnecting the power source to the electric vehicle;

a power controller interconnected between the power source and the connector and coupled to the processor, the power controller selectively providing power to the connector in response to commands from the processor, the power controller further comprising a sower meter for measuring the amount of electricity flowing therethrough;

a vehicle presence sensor positioned in a vehicle parking space associated with the parking meter and interconnected to the processor for sensing when a vehicle is removed from the parking space associated with the meter, the vehicle presence sensor comprising means for resetting the meter when the vehicle is removed from the parking space, thereby to reset the unused recharge time to a condition prior to the user selection of the recharge time entered on the input device; and an interrupt switch, interconnected between the power supply and the connector for disconnecting the power from the connector.

2. The electric vehicle recharging parking meter of claim 1 further comprising a support post, the display, input device, payment receptor and connector being mounted on the support post.

3. The electric vehicle recharging parking meter of claim 1 wherein the power source comprises solar panel means for generating electrical power from the sun and means for storing the power generated by the solar panel means.

4. The electric vehicle recharging parking meter of claim 1 wherein the power source comprises a wind generator for generating electrical power from the wind and means for storing the power generated by the wind generator.

5. The electric vehicle recharging parking meter of claim 1 wherein the power controller further comprises:

a transformer coupled to the power source for converting the power from the power source to power having a voltage compatible with the electrical vehicle; and a voltage selector coupled to the transformer and operable in response to commands from the processor for selecting the voltage compatible with the electrical vehicle.

6. The electrical vehicle recharging parking meter of claim 1 wherein the interrupt switch is a ground fault interrupt switch.

7. The electric vehicle recharging parking meter of claim 2 further comprising an interrupt switch sensitive to movement, the interrupt switch being interconnected between the power supply and the connector for disconnecting the power from the connector in response to movement of the parking meter.

8. The electric vehicle recharging parking meter of claim 1 wherein the input device is a keypad.

9. The electric vehicle recharging parking meter of claim 1 wherein the payment receptor comprises a cash receptor, the cash receptor coupled to the processor for communicating the amount of cash inserted by the user in the cash receptor.

10. The electric vehicle recharging parking meter of claim 1 wherein the payment receptor comprises a card reader.

11. The electric vehicle recharging parking meter of claim 10 further comprising a communications link coupled between the card reader and an approval center for communicating the card information read by the card reader to the approval center and receiving approval for the card usage from the approval center.

12. The electric vehicle recharging parking meter of claim 1 wherein the power controller further comprises a recharge regulator interconnected between the power source and the connector for terminating the recharge of the electrical vehicle when the batteries of the vehicle are fully charged.

13. The electric vehicle recharging parking meter of claim 1 wherein the connector further comprises:

a housing for the connector;

a cover hinged to the housing adjacent to the connector for pivoting between a closed access position covering the connector and an opened access position;

a solenoid actuated latch apparatus connected to the housing and comprising at least one bolt for moving into engagement with the cover when the cover is in the closed access position for preventing movement of the cover from the closed access position and at least one solenoid interconnected to the bolt for enabling movement of the bolt, the solenoid coupled to the processor whereby the cover is enabled to pivot between the closed access position and the opened access position in response to command from the processor.

14. A parking meter system comprising:

a central unit comprising:

a processor;

a display interconnected to the processor for giving visual information to a user;

an input device interconnected to the processor for enabling the user to select a recharging time for the electric vehicle and a parking time, the processor being responsive to the user selection entered on the input device to select the time for parking and the time for recharging the vehicle;

a payment receptor for receiving payment for the parking and recharge time selected by the user, the payment receptor interconnected to the processor for indicating receipt of payment for parking time and recharge electricity;

a power source; and a plurality of parking meters each interconnected to the central unit for being controlled by the central unit, each parking meter comprising:

a connector for interconnecting the power source to the electric vehicle;

a display interconnected to the processor for providing visual information to the user;

a power controller interconnected between the power source and the connector of each of the plurality of parking meters and operable in response to signals from the processor for selectively providing power to the plurality of connectors in response to the processor, the power controller further comprising a plurality of power meters, one associated with each parking meter for measuring the amount of electricity flowing therethrough to the associated parking meter;

a vehicle presence sensor positioned in a vehicle parking space associated with each parking meter and interconnected to the processor for sensing when a vehicle is removed from a parking space associated with a meter, the vehicle presence sensor comprising means for resetting the meter when the vehicle is removed from the parking space, thereby to reset the unused recharge time to a condition prior to the user selection of the recharge time entered on the input device.

15. The parking meter system of claim 14 wherein the power controller comprises:

a transformer coupled to the power source for converting the power from the power source to a plurality of voltages; and a selector coupled to the transformer and operable in response to commands from the processor for selecting a parking meter to which power is to be supplied and further selecting one of the plurality of voltages and interconnecting that selected voltage to the selected parking meter.

16. The parking meter system of claim 14 wherein the payment receptor comprises a magnetic strip reader for reading credit card information, the meter system further comprising a communications link coupled between the magnetic strip reader and an approval center for communicating the credit card information read by the magnetic strip reader to the approval center and receiving approval for the credit card usage from the approval center.

17. The parking meter system of claim 14 wherein the power controller further comprises a plurality of recharge regulators, one associated with each parking meter and interconnected between the power source and the connector for the associated parking meter for terminating the recharge of the electrical vehicle interconnected to the associated meter when the batteries of the vehicle are fully charged.

\* \* \* \* \*